(12) United States Patent
Hirose

(10) Patent No.: US 8,358,926 B2
(45) Date of Patent: Jan. 22, 2013

(54) IMAGING APPARATUS AND METHOD FOR CONTROLLING SAME

(75) Inventor: Minoru Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 12/891,630

(22) Filed: Sep. 27, 2010

(65) Prior Publication Data

US 2011/0076006 A1 Mar. 31, 2011

(30) Foreign Application Priority Data

Sep. 29, 2009 (JP) ................................. 2009-224547

(51) Int. Cl.
*G03B 7/10* (2006.01)
*G03B 9/02* (2006.01)
(52) U.S. Cl. ........................................ 396/260; 396/508
(58) Field of Classification Search .................. 396/260, 396/508; 348/363
See application file for complete search history.

(56) References Cited

U.S. PATENT DOCUMENTS

| | | | | | |
|---|---|---|---|---|---|
| 4,874,233 | A | * | 10/1989 | Yamomoto et al. | 359/703 |
| 5,278,605 | A | * | 1/1994 | Satoh | 396/63 |
| 5,418,588 | A | * | 5/1995 | Chigira | 396/463 |
| 5,893,651 | A | * | 4/1999 | Sakamoto | 396/86 |
| 5,956,528 | A | * | 9/1999 | Tanaka | 396/52 |
| 6,154,613 | A | * | 11/2000 | Kawai | 396/64 |
| 7,742,695 | B2 | * | 6/2010 | Hirose | 396/260 |
| 2002/0071048 | A1 | * | 6/2002 | Kaneda | 348/363 |
| 2007/0116453 | A1 | * | 5/2007 | Uchiyama | 396/246 |
| 2009/0284643 | A1 | * | 11/2009 | Shibuno et al. | 348/347 |
| 2010/0220990 | A1 | * | 9/2010 | Tsujiyama | 396/260 |

FOREIGN PATENT DOCUMENTS

| | | |
|---|---|---|
| CN | 101236347 A | 8/2008 |
| JP | 07-077648 A | 3/1995 |

OTHER PUBLICATIONS

Chinese Office Action issued in corresponding application No. 201010501420.X dated Jul. 23, 2012.

* cited by examiner

*Primary Examiner* — Christopher Mahoney
(74) *Attorney, Agent, or Firm* — Carter, DeLuca, Farrell & Schmidt LLP

(57) ABSTRACT

In an imaging apparatus including a stepping motor that drives a diaphragm, a favorable moving image exposure control is carried out while reducing electrical power required for holding the diaphragm position. For moving image exposure control, a determination unit determines the presence or absence of the diaphragm driving. When a rotor and the magnetic poles of the stator do not face to each other in the first operation mode, the control unit of a stepping motor drives the rotor to a facing position, and shuts off the current in a coil. When the diaphragm driving does not occur in the second operation mode, the control unit of a stepping motor shuts off the current in the coil at the state where the rotor of the motor and the magnetic poles of the stator face to each other. A holding current to be supplied to the motor is shut off in the first and second operation modes, whereby the lower power consumption can be realized. The program profile of a diaphragm drive method and an exposure control is switched depending on the type of an imaging lens unit, whereby a favorable moving image exposure control can be realized.

9 Claims, 9 Drawing Sheets

FIG. 3

| MODE | M0 | M1 |
|---|---|---|
| SLEEP | 0 | 0 |
| 1-PHASE EXCITATION DRIVING | 0 | 1 |
| 1-2-PHASE EXCITATION DRIVING | 1 | 0 |
| MICRO-STEP DRIVING | 1 | 1 |

FIG. 4

| VOUT | VA3 | VA2 | VA1 | VA0 |
|---|---|---|---|---|
| 0 % | 0 | 0 | 0 | 0 |
| 20 % | 0 | 0 | 0 | 1 |
| 40 % | 0 | 0 | 1 | 0 |
| 56 % | 0 | 0 | 1 | 1 |
| 71 % | 0 | 1 | 0 | 0 |
| 83 % | 0 | 1 | 0 | 1 |
| 91 % | 0 | 1 | 1 | 0 |
| 100 % | 0 | 1 | 1 | 1 |
| 0 % | 1 | 0 | 0 | 0 |
| 10 % | 1 | 0 | 0 | 1 |
| 20 % | 1 | 0 | 1 | 0 |
| 28 % | 1 | 0 | 1 | 1 |
| 36 % | 1 | 1 | 0 | 0 |
| 42 % | 1 | 1 | 0 | 1 |
| 46 % | 1 | 1 | 1 | 0 |
| 50 % | 1 | 1 | 1 | 1 |

FIG. 5A 1-PHASE EXCITATION DRIVING
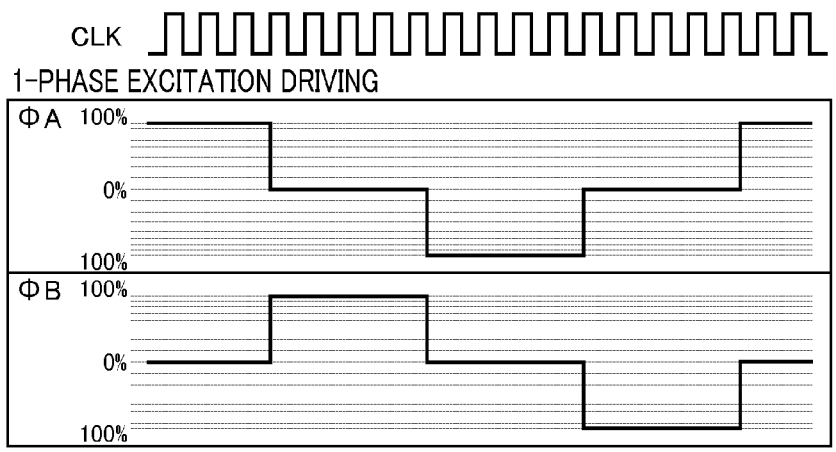
FIG. 5B 2-PHASE EXCITATION DRIVING
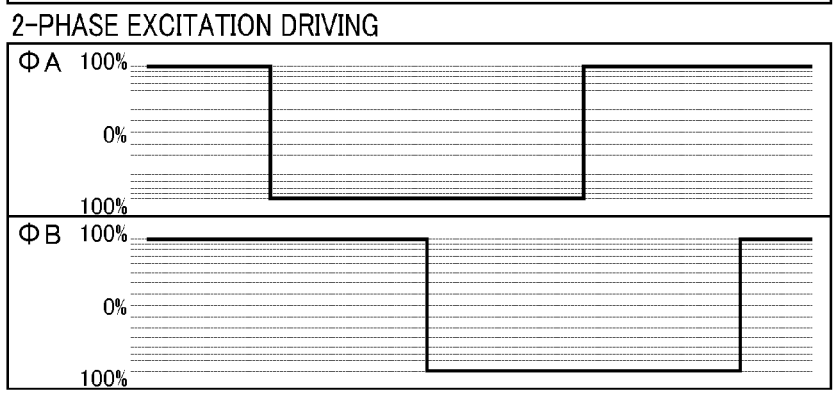
FIG. 5C 1-2-PHASE EXCITATION DRIVING
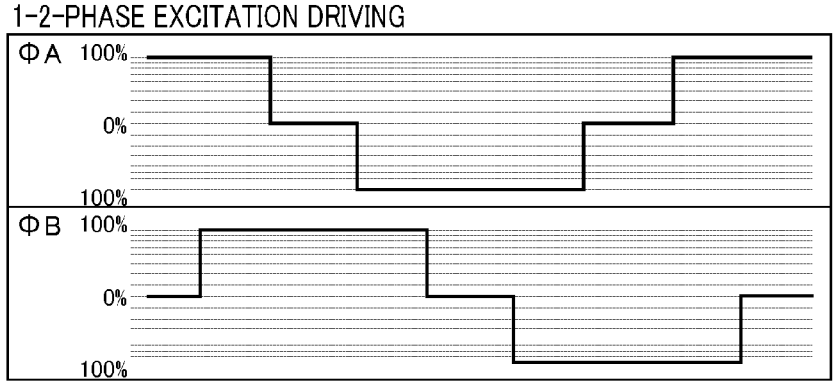
FIG. 5D MICRO-STEP DRIVING
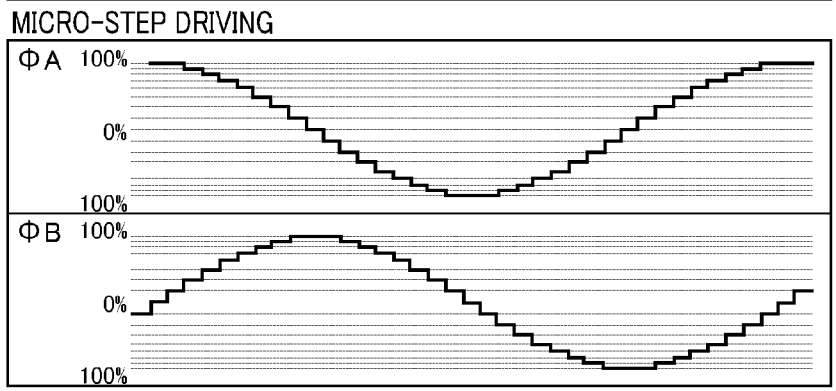

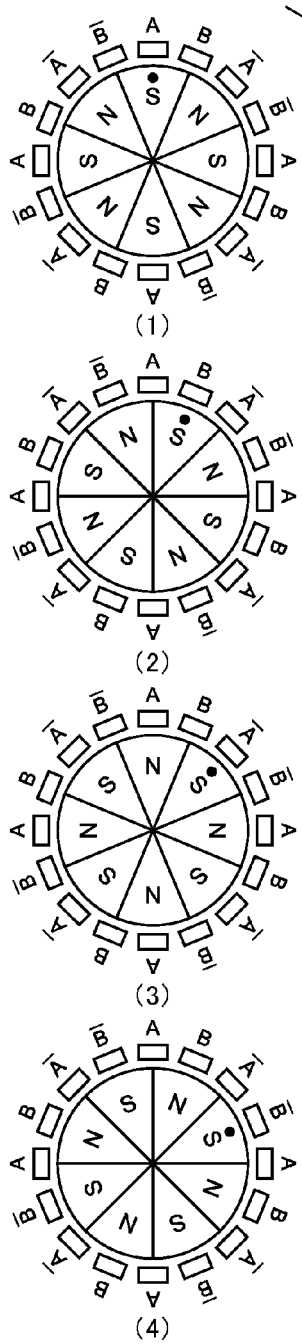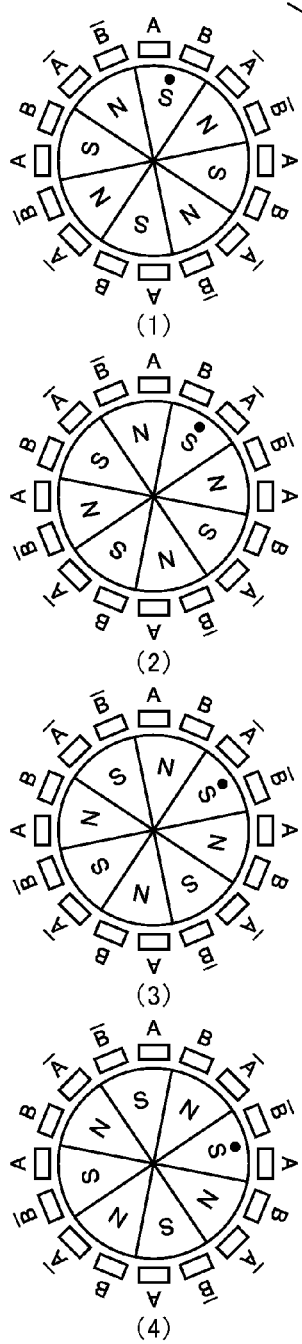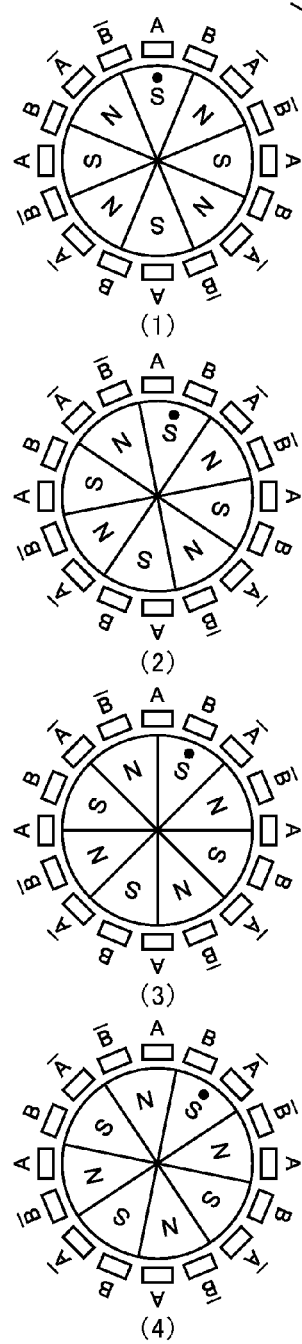
FIG. 6A  1-PHASE EXCITATION DRIVING
FIG. 6B  2-PHASE EXCITATION DRIVING
FIG. 6C  1-2-PHASE EXCITATION DRIVING

WHEN A LENS NOT CORRESPONDING TO THE MICRO-STEP IS MOUNTED

WHEN A LENS CORRESPONDING TO THE MICRO-STEP IS MOUNTED

IMAGING APPARATUS AND METHOD FOR CONTROLLING SAME

BACKGROUND OF THE INVENTION

1. Field of the Invention

The present invention relates to a drive and position control of a diaphragm. In particular, the present invention relates to a technique in which power consumption can be lowered in consideration of responsiveness of moving image exposure.

2. Description of the Related Art

Currently, in what is referred to as a "single-lens reflex type" digital camera of which the interchangeable lens is removable, a product that has a live view function that displays a preview image prior to photographing a still picture on a TFT monitor disposed on the rear face of a casing or is capable of photographing a moving picture is known. Conventionally, there has been required high-speed responsiveness and high positional accuracy for focus driving, diaphragm driving, and the like of an interchangeable lens, since the primary aim was still picture photographing. For this reason, a stepping motor excellent in driving characteristics and controllability tends to be employed as an actuator for driving the diaphragm. The drive methods of a stepping motor includes 1-phase excitation drive, 2-phase excitation drive, 1-2-phase excitation drive, and the like, which may be provided for separate use in accordance with applications.

In order to ensure that a stepping motor is employed as the actuator for the diaphragm to stop the diaphragm to hold it at that particular position, it is required that a holding current continuously flows through a coil of the excitation phase at the stop position. A holding current itself may be smaller than the current used during driving. However, this is a direct current, and, if this state persists for a long time particularly when a battery is employed as the power supply, power may be consumed and heat generated despite the fact that the diaphragm is not being driven. This particularly creates problems when a battery is employed for a power supply.

In the 1-phase excitation drive, even if a current supplied to a stepping motor is shut off in a stop state, the magnetic poles of the rotor and the stator face to each other, and the stop position is held by the magnetic force of the rotor. However, the rotation stepping angle per step is large, which is not suitable when highly accurate positioning, such as a diaphragm, is required.

In the 2-phase excitation drive, the rotor stops at a position intermediate between two phases. Hence, in order to stably hold the stop position, a minimum holding current must continuously flow through the coil in the stop state. As a result, power consumption and heating occur.

In the 1-2-phase excitation drive that combines the 1-phase excitation drive and the 2-phase excitation drive, the rotation stepping angle per step becomes as half that of the driving methods, and thereby a fine control can be carried out. In the 1-phase stop position, the stop position can be held even if a current is shut off, whereas in the 2-phase stop position, a holding current is required. Even if the holding current is decreased to a limit value at which the stop position of the rotor can be held, the holding current cannot be ignored when the use of the battery power supply is considered.

As described above, realizing a satisfactory drive control by using any of the drive methods is difficult. In particular, when exposure control is performed by a diaphragm during moving picture photographing or the like, accurate controllability of the diaphragm and holding it at the stop position are required.

In order to solve the aforementioned problems, a method for driving a focus lens, which is disclosed in Japanese Patent Laid-Open No. 7-77648, is known. In this method, even when the stop position needs not to be strictly controlled by adjusting the depth of field or the like and the stepping motor is at a 2-phase stop position, the stepping motor is rotated by 1-step within the range of the depth to thereby stop at a 1-phase position. When the subject is within the depth of field, the rotor is rotated by 1-step to a position of a 1-phase excitation phase and then the electricity is shut off, whereby a holding current becomes zero. When the subject is outside the depth of field, the current limitation is performed.

However, when the method disclosed in Japanese Patent Laid-Open No. 7-77648 is applied to a method for controlling a diaphragm under the exposure control of a moving image, there are problems with controllability and power consumption. For example, when an imaging lens unit that provides poor controllability of the diaphragm is mounted on a camera body, a problem such as flickering or the like occurs by the operation by which the rotor is moved to a position of a 1-phase excitation phase. Also, when long term photographing such as moving picture photographing or the like is expected, power consumption becomes large even if current limitation is performed. Therefore it is desired that the diaphragm be held when the holding current is zero

SUMMARY OF THE INVENTION

In view of the foregoing, according to an aspect of the present invention, an imaging apparatus is provided that includes a lens section having a lens group and a diaphragm; a stepping motor that drives the diaphragm by means of the excitation of a plurality of coils; a control unit configured to control the stepping motor; an exposure control unit configured to control exposure during video photography by changing a diaphragm value, a charge accumulation time, or a gain of an imaging element; and a determination unit configured to determine whether or not the amount of change in position of the diaphragm is equal to or greater than a predetermined amount, when a current supplied to the plurality of coils is shut off.

The control unit switches operation modes in association with the driving of the stepping motor depending on the type of the lens section, in a first operation mode using a phase by which the position of a rotor is not held when a current supplied to the plurality of coils is shut off; the control unit controls the stop position of the diaphragm based on the output of the exposure control unit and the determination result obtained by the determination unit; and in a second operation mode using only a phase by which the position of a rotor is held when a current supplied to the plurality of coils is shut off, the control unit performs diaphragm control based on the output of the exposure control unit.

According to the present invention, in an imaging apparatus that performs diaphragm driving using the stepping motor, the operation modes are switched depending on the type of a lens section, whereby a favorable moving image exposure control is carried out while reducing electrical power required for holding the diaphragm position.

Further features of the present invention will become apparent from the following description of exemplary embodiments with reference to the attached drawings.

BRIEF DESCRIPTION OF THE DRAWINGS

FIG. 3 is a diagram illustrating an example of the drive mode of the diaphragm control circuit.

FIG. 4 is an explanatory diagram of the micro-step drive of the diaphragm control circuit.

FIG. 5A is an explanatory diagram of the operation mode of the diaphragm control circuit.

FIG. 5B is an explanatory diagram of the operation mode of the diaphragm control circuit.

FIG. 5C is an explanatory diagram of the operation mode of the diaphragm control circuit.

FIG. 5D is an explanatory diagram of the operation mode of the diaphragm control circuit.

FIG. 6A is an explanatory diagram of each of the driving methods.

FIG. 6B is an explanatory diagram of each of the driving methods.

FIG. 6C is an explanatory diagram of each of the driving methods.

DESCRIPTION OF THE EMBODIMENTS

Hereinafter, preferred embodiments of the present invention will now be described in detail with reference to the accompanying drawings.

Figure 1:
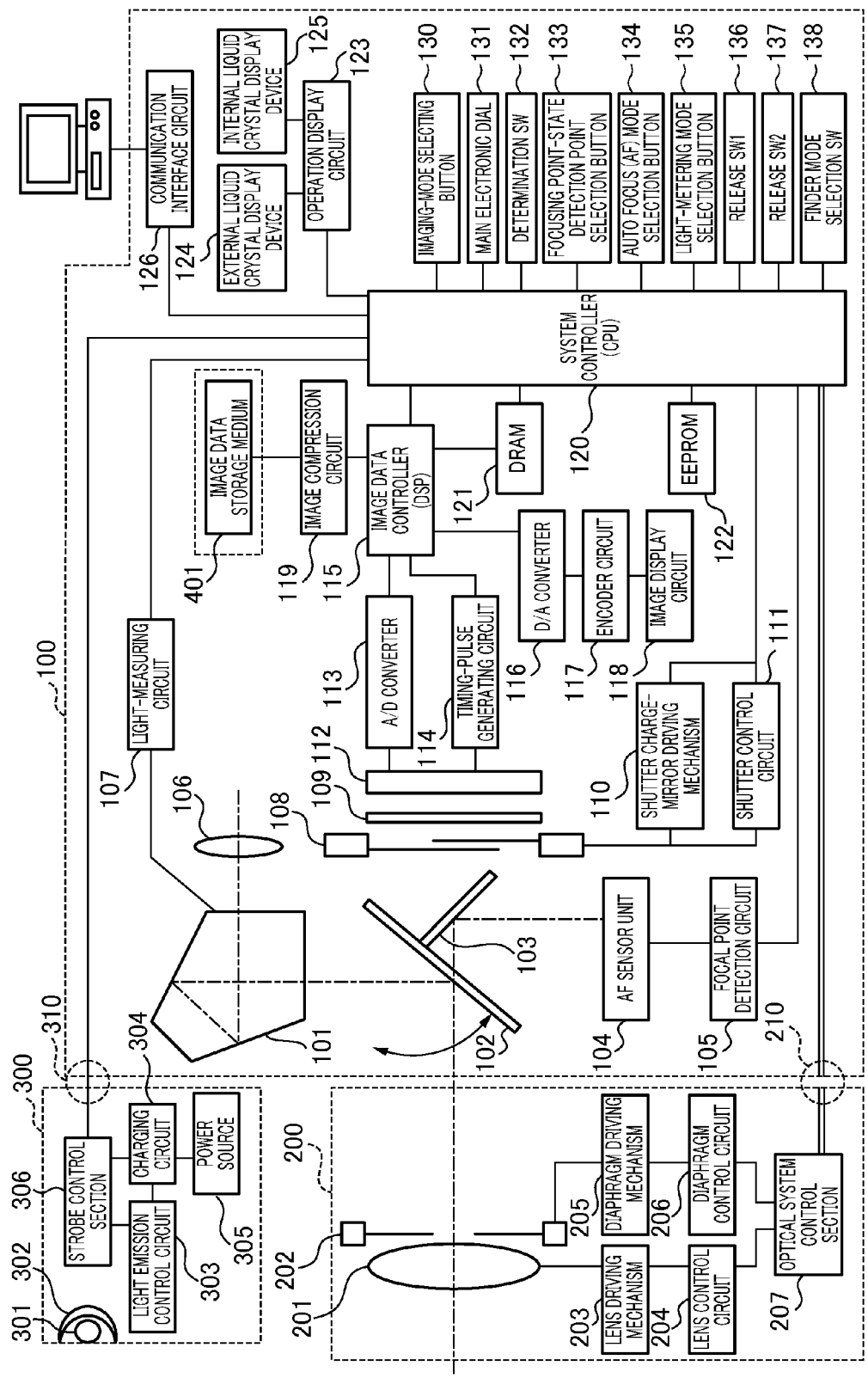
FIG. 1 is a diagram illustrating exemplary structure of an imaging apparatus according to an embodiment of the present invention in conjunction with FIGS. 2 to 10.

FIG. 1 is a block diagram illustrating an exemplary configuration of a single-lens reflex type digital camera as an imaging apparatus according to an embodiment. An imaging lens unit 200 is detachably mounted on a camera body 100 via a mounting mechanism (not shown). A mounting part includes a group of electric contact points 210. The group of contact points 210 transmits and receives a control signal, a state signal, a data signal, and the like between the camera body 100 and the imaging lens unit 200. The group of contact points 210 also supplies various types of voltages including a power supply voltage transmitted from the imaging lens unit 200 to a system controller 120. Owing to the group of contact points 210, the camera body 100 can communicate with the imaging lens unit 200 to drive an imaging lens 201 (while only one lens is shown in FIG. 1, a plurality of lens groups may also be included) and a diaphragm 202 in the imaging lens unit 200. The group of contact points 210 may transmit a signal through optical communication, audio communication and the like, as well as through electrical communication. The group of contact points 210 and the system controller 120 constitute a lens detection unit.

An imaging light flux from the object image reaches a quick return mirror 102, which is pivotable in the direction of the arrow shown in FIG. 1, via the lens section that includes the imaging lens 201 and the diaphragm 202. A center portion of the quick return mirror 102 is a half mirror, through which a part of the light flux is transmitted when the quick return mirror 102 is driven downward to the position shown in FIG. 1. The transmitted light flux is downwardly reflected by a sub mirror 103 disposed on the quick return mirror 102 to thereby reach an auto focus (AF) sensor unit 104. The AF sensor unit 104 is of a phase difference detecting type which includes a field lens disposed near an image forming surface (not shown), a reflection mirror, a second image forming lens, the diaphragm, a line sensor having a plurality of charge coupled devices (CCD) and the like. A focusing point detection circuit 105 controls the AF sensor unit 104 based on the control signal from the system controller 120, and detects a focusing point by the known phase difference detecting method. It should be noted that the AF sensor unit 104 and the focusing point detection circuit 105 constitute a focusing point detection unit.

At the same time, the imaging light flux reflected on the quick return mirror 102 reaches a user's or photographer's eye via a pentaprism 101 and an eyepiece lens 106. A light-metering sensor (not shown) is provided near the eyepiece lens 106. The sensor output, i.e., the result of the measurement of the brightness of the object image is transmitted to the system controller 120 via a light-metering circuit 107. The light-metering sensor, the light-metering circuit 107, and the system controller 120 constitute a light-metering unit.

When the quick return mirror 102 is driven upward and retracted from the imaging optical axis, the light flux from the imaging lens 201 reaches an imaging element 112 using an image sensor such as a complementary metal-oxide semiconductor (CMOS) and the like via a focal plane shutter 108 and a filter 109.

The focal plane shutter 108 has a front screen and a rear screen so as to perform control to transmit and block the light flux emitted from the imaging lens 201. The filter 109 has two functions. One is cutting off infra-red rays to lead only visible light to the image sensor 112. The other is serving as an optical low pass filter. Note that the sub-mirror 103 is adapted to be folded when the quick return mirror 102 is driven upward.

The camera body 100 includes the system controller 120 constituted by an arithmetic processing unit such as a CPU or the like that controls the entire camera body 100 and appropriately controls an operation of each part of the camera body 100. The system controller 120 transmits the control command to an optical system control section 207 of the imaging lens unit 200, controls a lens driving mechanism 203 via a lens control circuit 204, and controls a diaphragm driving mechanism 205 via a diaphragm control circuit 206. The optical system control section 207 is constituted by a CPU or the like. The optical system control section 207 and the diaphragm control circuit 206 constitute a control unit configured to control a stepping motor for driving the diaphragm.

The lens driving mechanism 203 moves a focus lens (not shown) in an optical axis direction to perform focus adjustment. Also, the diaphragm driving mechanism 205 drives the diaphragm 202 using the stepping motor as a driving source. The system controller 120 controls a shutter charge-mirror driving mechanism 110 to perform control to drive the quick return mirror 102 to thereby control shutter-charge of the focal plane shutter 108. The system controller 120 is connected with a shutter control circuit 111 configured to control the travel of the front and rear screens of the focal plane shutter 108. The driving source of each of the front and rear screens of the focal plane shutter 108 is constituted by a spring, and thus a spring charge is required for the next operation after the shutter travel.

The system controller 120 is connected with an electrically erasable and programmable read only memory (EEPROM) 122 that stores a parameter that must be adjusted for controlling the camera and camera identification data (ID) information for identifying the camera itself. The EEPROM 122 also stores AF compensation data, an automatic exposure compensation value, and the like adjusted by the reference lens.

The optical system control section 207 includes a lens information storage device (not shown) that stores information inherent to a lens such as a focusing point distance, full-opened diaphragm, lens ID information assigned to each lens, and information received from the system controller 120. The system controller 120 controls the lens driving mechanism 203 via the optical system control section 207 to form an image of the object on the imaging element 112. Also, the system controller 120 controls the diaphragm driving mechanism 205 based on an Av value corresponding to a set diaphragm value and further outputs a control signal to the shutter control circuit 111 based on a Tv value corresponding to a set shutter-speed value to thereby perform exposure control.

The system controller 120 is connected with an image data controller 115. The image data controller 115 includes a digital signal processor (DSP). The image data controller 115 controls the image sensor 112, and corrects and processes an image data that is input by the image sensor 112. Note that the system controller 120 and the image data controller 115 have a light-metering function. The image data controller 115 divides the image signal into regions and supplies them to the system controller 120. Then, the system controller 120 evaluates an integrated value for each bayer pixel in each region to thereby perform light-metering processing.

The image data controller 115 is connected with a timing-pulse generation circuit 114 that outputs a drive pulse signal to the imaging element 112. An analog/digital (A/D) converter 113 receives a timing pulse generated by the timing-pulse generation circuit 114 and then converts an analog signal corresponding to the object image output from the imaging element 112 into a digital signal and then sends it to the image data controller 115. The obtained digital image data is temporarily stored in a dynamic random access memory (DRAM) 121. The DRAM 121 is used for temporarily storing image data before being subjected to processing or data conversion into a predetermined format. An image compression circuit 119 is connected with a storage section including a storage medium 401.

The image compression circuit 119 performs compression or conversion of image data (e.g., JPEG) stored in the DRAM 121 to store the converted image data in the storage medium 401. Examples of the storage medium 401 include a magnetic storage medium, a semiconductor memory, and the like.

A digital/analog (D/A) converter 116 that converts digital image data into an analog signal is connected with an image display circuit 118 via an encoder circuit 117. The image display circuit 118 is constituted by a color liquid crystal display element or the like for displaying the image data captured by the imaging element 112. The image data controller 115 converts the image data on the DRAM 121 into an analog signal by the D/A converter 116 and outputs the analog signal to the encoder circuit 117. The encoder circuit 117 converts the output of the D/A converter 116 into a video signal (e.g., National Television System Committee (NTSC) signal) necessary for driving the image display circuit 118.

Furthermore, the system controller 120 and the image data controller 115 have a focusing point detection function. The image data controller 115 causes the corrected image data to pass through a filter having a predetermined frequency characteristic and evaluates a contrast in a predetermined direction of the image signal obtained after gamma processing. When the system controller 120 receives the result, the system controller 120 communicates with the optical system control section 207 to adjust a focal position so that the contrast evaluation value is higher than a predetermined level.

Further, the system controller 120 is connected with an operation display circuit 123 that causes an external liquid crystal display device 124 and an internal liquid crystal display device 125 to display the operation mode information of the digital camera and exposure information such as a shutter second time, diaphragm value, or the like. A communication interface circuit 126 communicates with external appliances. The operating means for providing user's or photographer's operation instructions to the system controller 120 are, for example, as follows.

The system controller 120 is further connected with a main electronic dial 131, a determination SW 132, and a photographic mode selection button 130 that sets a mode so that an electronic camera can perform an operation desired by a user.

An imaging-mode selection button (130): A button for setting a mode to cause a camera to execute an operation desired by a user.

A main electronic dial (131) and a determination SW (132).

A focusing point-state detection point selection button (133): A button for selecting a focus detection position to be used from among a plurality of focus detection positions sensed by the AF sensor unit 104.

An auto focus (AF) mode selection button (134) and a light-metering mode selection button (135).

A release SW1 (136): A switch for starting an imaging preparation operation such as light-metering, focus detection, and the like.

A release SW2 (137): A switch for starting an imaging operation.

A viewfinder mode selection SW 138: A switch for switching between an optical viewfinder mode that can confirm light flux passing through the eyepiece lens 106 and a live view display mode that can sequentially display the image received by the imaging element 112 on a display section with the image display circuit 118.

In addition, a power supply control circuit, a power supply section controlled by the circuit, and the like are provided in the camera body 100. However, the illustration and the explanation will not be given here because they are already known.

A strobe device 300 is detachably mounted on the camera body 100 via a mounting mechanism (not shown). A mounting part includes a group of electric contact points 310. The group of contact points 310 transmit and receive a control signal, a state signal, a data signal, and the like between the camera body 100 and the strobe device 300. The strobe device 300 is provided with a control terminal for light emitting timing and a communication terminal with the system controller 120. The strobe device 300 includes a xenon (Xe) tube 301 and a reflection shade 302. A light emission control circuit 303 is constituted by an insulated gate bipolar transistor (IGBT) or the like that controls the emission of light from the Xe tube 301. A charging circuit 304 generates an voltage of about 300 V to power the Xe tube 301. A battery that powers the charging circuit 304 or the like is used for a power source 305. A strobe control section 306 controls light emission from a strobe, charging, and the like, as well as communicates with the system controller 120 of the camera side.

Next, the diaphragm control circuit 206 will be described in detail with reference to FIG. 2.

The diaphragm control circuit 206 performs the drive control of a stepping motor used for the diaphragm driving mechanism 205. A BLK-A is a drive section for one phase of a stepping motor, and a BLK-B is also a drive section having the same circuit configuration as that of the drive section BLK-A. A decoder 216 generates a drive control signal to the drive sections BLK-A and BLK-B in response to a control signal from the optical system control section 207. The output signal of the decoder 216 is sent to a NOT (logical NOT) circuit 221, a NOR (negative OR) circuit 223, and an NPN transistor 227 to be described below. The output signal of a NOT circuit 211 is sent to a NOR circuit 222 and an NPN transistor 226 to be described below.

Upper PNP transistors 224 and 225 and lower NPN transistors 226 and 227 constitute a so-called "H-bridge". The output signal of the NOR circuit 222 is input to the base of the PNP transistor 224, and the output signal of the NOR circuit 223 is input to the base of the PNP transistor 225. The respective emitters of the PNP transistors 224 and 225 are connected to each other to be supplied with a predetermined power supply voltage. Also, the respective emitters of the NPN transistors 226 and 227 are connected to each other and are grounded via a resistor 229. The resistor 229 is used for the detection of drive current for a stepping motor.

The plus input terminal of a comparator 228 is connected with the ungrounded terminal of the resistor 229, and the minus input terminal thereof is connected with a reference voltage generation circuit 220. The output signal of the comparator 228 is input to the NOR circuits 222 and 223. The reference voltage generation circuit 220 generates a reference voltage shown in FIG. 4 in response to the outputs VA0 to VA3 (or VB0 to VB3) of the decoder 216. Note that in FIG. 4, the voltage VOUT in response to the logical values of VA0 to VA3 is represented as a percentage with respect to a predetermined voltage in a tabular format.

Next, the configuration of a stepping motor will now be described in detail. In an A-phase stator 251, an A-phase coil 252 is wound around an A-phase yoke. One end of the A-phase coil 252 is connected with the collector of the PNP transistor 224 and the NPN transistor 226, and the other end is connected with the collector of the PNP transistor 225 and the NPN transistor 227.

In a B-phase stator 253, a B-phase coil 254 is wound around a B-phase yoke. Although it is not shown, the B-phase coil 254 is also connected with the collector of each of transistors of BLK-B in the same manner as described above.

Figure 2:
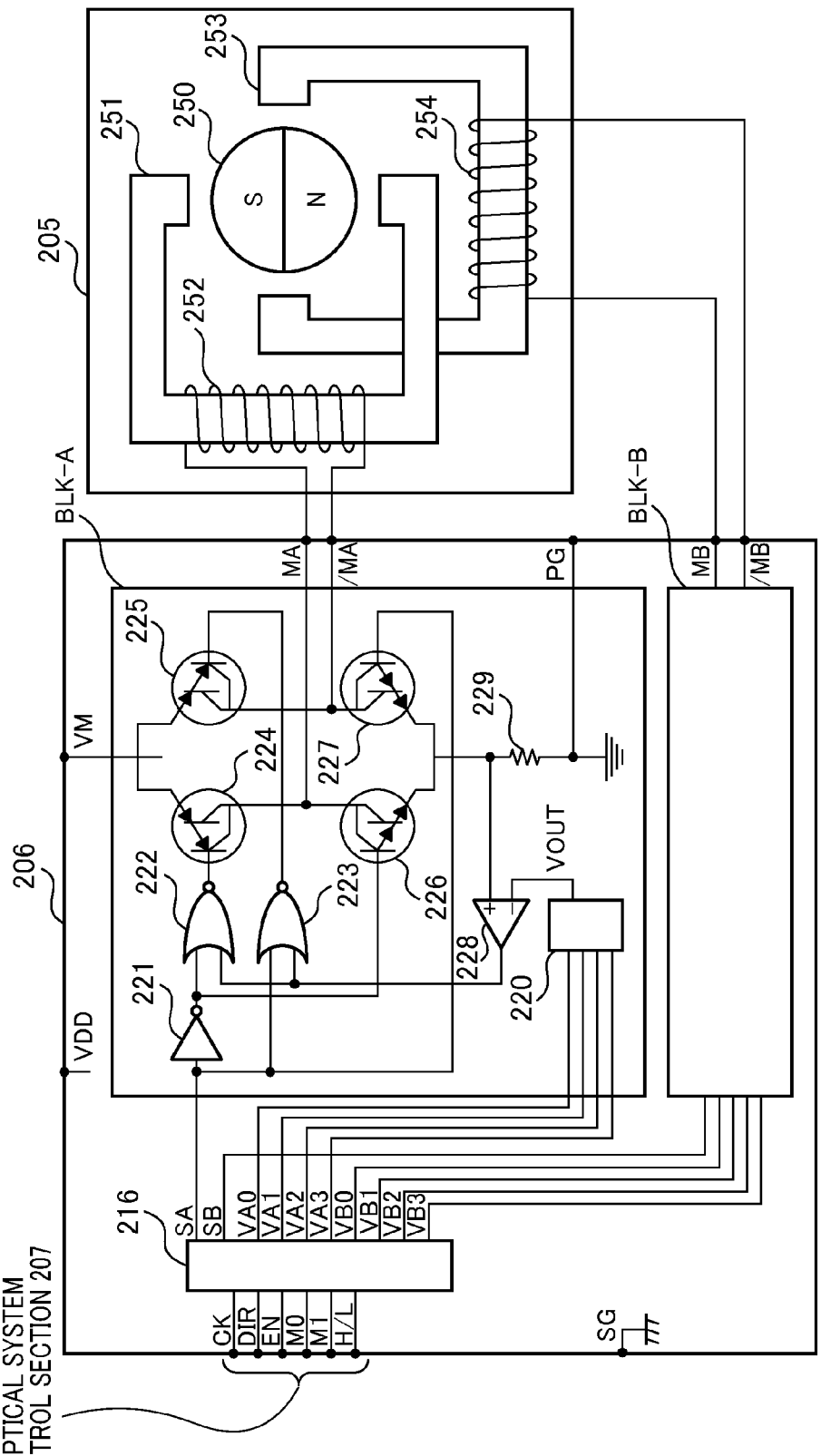
FIG. 2 is a diagram illustrating a diaphragm driving control circuit.

A rotor 250 is disposed opposite to the protrusion of each stator and is magnetized alternately between the N-pole and the S-pole (in FIG. 2, only two poles are shown).

Next, the terminals of the diaphragm control circuit 206 will now be described. As used herein, each of the codes shown in FIG. 2 has a meaning as follows:

CK: A clock input terminal to which the driving frequency signal of the stepping motor is input.
DIR: An input terminal for specifying the rotational direction of the stepping motor.
EN: An input terminal for specifying the drive and stop of the stepping motor.
M0, M1: An input terminal for specifying the drive mode of the stepping motor.
H/L: An input terminal for specifying the drive current of the stepping motor.

The input signals to the aforementioned terminals are supplied by the optical system control section 207 shown in FIG. 1. As used herein, each of the other codes shown in FIG. 2 has a meaning as follows:

SG: A signal ground terminal.
VDD: A power supply input terminal for control circuit.
VM: A power supply input terminal for motor drive.
MA,/MA: An A-phase connection terminal of the stepping motor.
MB,/MB: A B-phase connection terminal of the stepping motor.
PG: A ground terminal of the motor system.

FIG. 3 shows the drive modes of the stepping motor with respect to signals input to the input terminals M0 and M1. When M0=0 and M1=0, the SLEEP mode is set, and the diaphragm control circuit 206 places itself in a low-power mode. When M0=0 and M1=1, 1-phase excitation drive is set. When M0=1 and M1=0, the 1-2-phase excitation drive is set. When M0=1 and M1=1, the micro-step drive is set. The aforementioned driving methods will be described in detail below.

FIG. 4 is a diagram for explaining the output voltage of the reference voltage generation circuit 220 provided in the diaphragm control circuit 206. Each of VA3 to VA0 is the output signal of the decoder 216. In response to these output signals VA3 to VA0, the reference voltage generation circuit 220 generates a VOUT (reference voltage). The reference voltage is input to the minus input terminal of the comparator 228. The comparator 228 compares the voltage generated in response to the current of the stepping motor flowing through the resistor 229 with the reference voltage. When the detection voltage detected by the resistor 229 is higher than a reference value, i.e., when the current flowing through the stepping motor is high, the output of the comparator 228 is set to a HI (high) level. The transistors 224 and 225 are turned off by the output signal of the NOR circuits 222 and 223, the current flowing through the A-phase coil 252 of the stepping motor is shut off. Consequently, the current flowing through the resistor 229 is shut off to zero, and thus the output signal of the comparator 228 becomes a LO (low) level. The transistors 224 and 225 are turned on by the output signal of the NOR circuits 222 and 223. By repeating the on-off cycle, the current flowing through the A-phase coil 252 of the stepping motor is controlled so as to be made substantially constant in response to the output voltage of the reference voltage generation circuit 220. Also, the VA3 signal shown in FIG. 4 is connected with the H/L input terminal of the decoder 216. With this arrangement, the drive current of the stepping motor can be switched between full-range (0 to 100% inclusive) and half-range(0 to 50% inclusive) in response to the input signal of the H/L terminal. In the drive section BLK-B show in FIG. 2, the operation for generating a reference voltage shown in FIG. 4 is similarly carried out by the output signals VB0 to VB3.

Next, the drive control of the stepping motor will now be described with reference to FIGS. 5 and 6.

In FIG. 5, CLK represents a reference clock signal to be input to the clock input terminal CK shown in FIG. 2. Also, ΦA and ΦB represent current waveforms flowing through the coils 252 and 254 of the stepping motor, respectively, and a plurality of transverse lines represents a current level corresponding to the voltage of the reference voltage generation circuit 220 shown in FIG. 4.

In the description of the drive methods of the stepping motor, the drive methods are generally classified into three types: 1-phase excitation, 2-phase excitation, and 1-2-phase excitation as shown in FIGS. 5A, 5B, and 5C. FIG. 5D shows the current control of a micro-step drive in which one step of the motor is controlled more finely by controlling the currents flowing through the coils 252 and 254 in a stepwise manner in the 1-2-phase excitation drive.

The waveforms shown in FIG. 5 shows the phase relationship of the currents flowing through the coils 252 and 254. In practice, since noise, vibration, and the like are removed, the actual waveform is not a simple rectangular waveform similar to the excitation waveform shown in FIG. 5, but may be a trapezoidal waveform with its rising edge and falling edge being inclined or another waveform rising and falling in a sinusoidal fashion. However, the phase relationship basically remains the same.

FIG. 6 shows how the rotor 250 of the stepping motor is rotated by the respective drive methods. The stepping motor used herein has two coils, i.e., an A-A bar phase and a B-B bar phase, the magnetic field generated by each coil is directed in a position shown in FIG. 6. Note that in FIG. 6, the A bar phase and the B bar phase are represented by adding "-" over the symbols A and B, respectively.

In the case of 1-phase excitation drive, the magnetic poles of the rotor are always moved to face the magnetic poles of the stator as shown in FIG. 6A. To be more specific, with a starting point from the magnetic pole of the rotor denoted by a black point shown in FIG. 6, the S-pole of the rotor shown by a black point is disposed facing to the A-phase in the state shown in (1) of FIG. 6A. When it reaches to the state shown in (2) of FIG. 6A, the B-phase becomes the N-pole, and the magnetic pole of the rotor denoted by a black point is moved to a position facing to the B-phase. Specifically, in the present example, the rotation of 22.5 degrees can be obtained with a change in the magnetic pole of the stator.

In 1-phase excitation drive, the rotation stepping angle per step is large, which is not suitable when highly accurate positioning is required, such as for a diaphragm. However, the magnetic poles of the rotor are always disposed to face the magnetic poles of the stator, which is convenient for holding the diaphragm position. This is because the rotation of the rotor can be prevented since the permanent magnet rotor is attracted to the metal stator to some extent even if a holding current does not flow while the motor is stopped.

In the case of the 2-phase excitation drive, the current shown in FIG. 5B is supplied to the coil of each phase, and thus the rotation of the rotor 250 is as shown in FIG. 6B. The rotor is moved so as to face a point intermediate between the adjacent magnetic poles of the stator. As in the 1-phase excitation drive, the rotor is rotated at an angle of 22.5 degree with a change in the magnetic pole of the stator. However, two excitation phases of the coils are always provided with electricity, whereby more powerful drive torque and drive speed can be obtained.

In the case of the 2-phase excitation drive, the magnetic pole of the rotor is always stopped so as to face a position intermediate between the adjacent magnetic poles of the stator. When the current supplied to the stator coil is shut off in a stop state, it would be expected that the rotor is moved at an angle of ½ step so as to face the stator of either left or right. The angle displacement of ½ step is caused by an error in the assembly of the magnetic poles of the stator, a slight deviation of the stop position, and the like. To be more specific, in the case of the 2-phase excitation drive, the coil needs to be excited even in the stop state, and thus the coil must be provided with electricity during a stop state in order to supply a minimum current sufficient to assure the magnetic field for holding the stop position of the rotor. The magnitude of holding current ranges from tens to hundreds mA per coil, and considerable heat is produced.

As shown in FIG. 5C, in the case of the 1-2-phase excitation drive, the 1-phase excitation and the 2-phase excitation are alternately repeated. Hence, as shown in (1) of FIG. 6C, when the rotation of the rotor is started from the position facing the magnetic pole of the stator, the rotor is moved in a position between the magnetic poles of the stator as shown in (2) of FIG. 6C in the next change in the magnetic pole. In the further change in the magnetic pole, the rotor is moved to face the next magnetic pole as shown in (3) of FIG. 6C. Hence, the rotation amount obtained by a change in the magnetic pole of the stator is 11.25 degrees, which corresponds to ½ that of the 1-phase excitation and the 2-phase excitation, and the rotational position of the rotor can thereby be controlled more finely. However, for the same reason as described above, when the stop position of the rotor is held, a current may be shut-off in the case where the stop position is the 1-phase excitation phase, whereas a holding current is necessary in the case where the stop position is the 2-phase excitation phase.

In the case of the micro-step drive, the currents flowing through the A-phase coil 252 and the B-phase coil 254 are controlled with respect to the 1-2-phase excitation shown in FIG. 5C in a stepwise manner as shown in FIG. 5D, whereby the rotational position of the rotor can be controlled more finely. In this manner, the diaphragm can be driven smoothly and quietly with high accuracy, which is suitable for diaphragm control or the like during video photography. In the micro-step drive, when the stop position of the rotor is the 1-phase excitation phase, the stop position can be held even if a current is shut off, as in the 1-2-phase excitation drive. However, in other stop positions including the 2-phase excitation phase, a current needs to flow so as to hold the state, and thus a current cannot be shut off.

While the detailed description has been made of the diaphragm control circuit 206, the diaphragm driving mechanism 205, and the drive for the stepping motor, the lens control circuit 204 can be controlled in the same manner since it is similarly structured in the same manner.

Next, an exemplary operation according to an embodiment of the present invention will now be described in detail with reference to FIGS. 7 to 10. Note that the present operation is carried out in accordance with a program that is interpreted and executed by the system controller 120.

Figure 7:
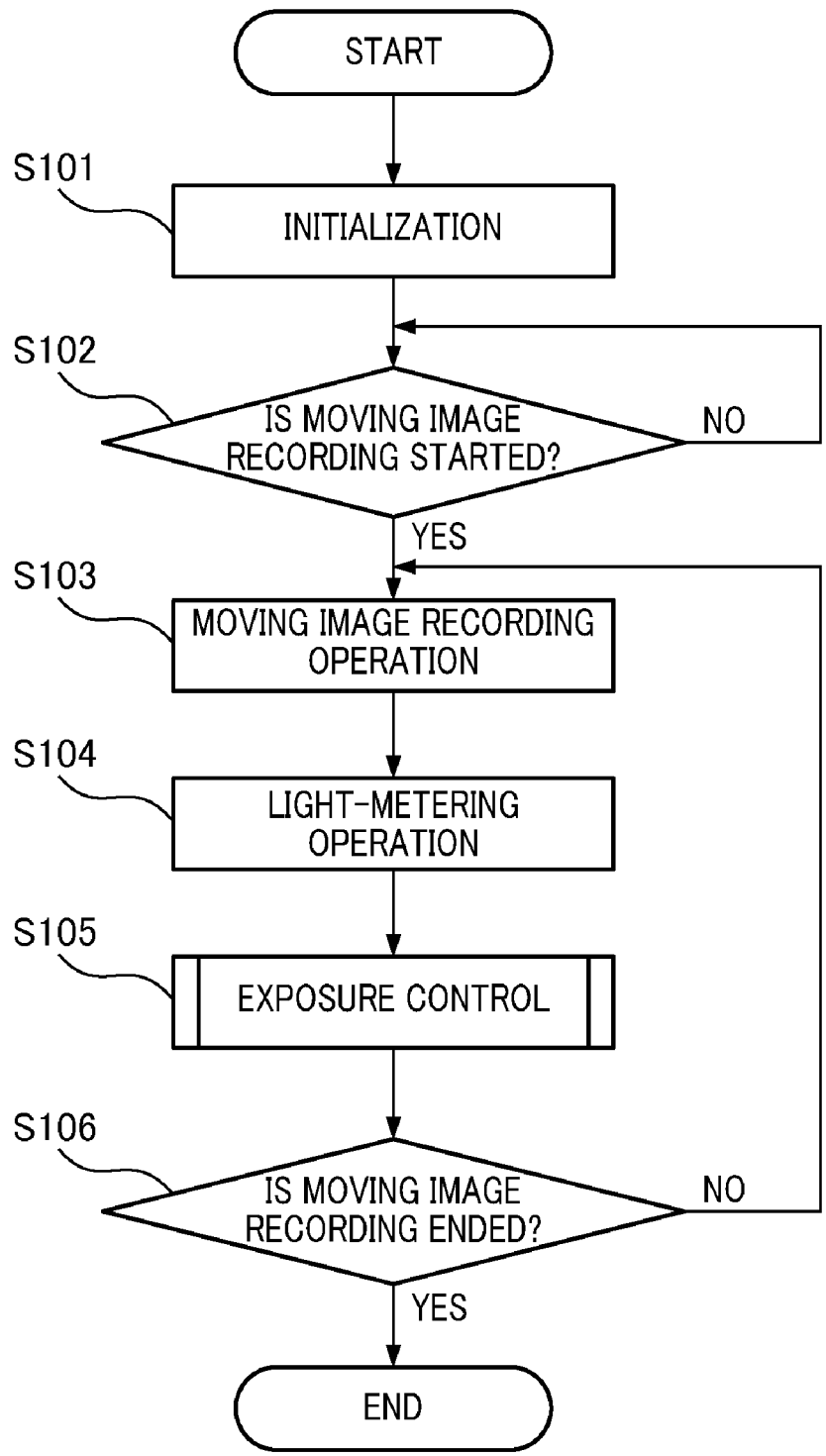
FIG. 7 is a flowchart illustrating an exemplary processing performed during video photography.

FIG. 7 is a flowchart illustrating a video photography operation. When the power supply of a camera is switched on in step S101, a program is loaded into the system controller 120, and an initialization process required for a camera operation and an initialization of control parameters are carried out. At this time, when the imaging lens unit 200 is mounted on the camera body 100, the optical system control section 207 notifies the system controller 120 of the camera body 100 about the lens ID (identification information) and information on various types of lenses. Lens information includes flag information for determining whether or not the diaphragm driving corresponds to a micro-step drive. Flag information is used for the switching of the operation modes to be described below.

After completion of the initialization process, the start of video recording is determined in step S102. When to the camera through a user's operation instructions is notified about a start command for video recording, the quick return mirror 102 and the sub-mirror 103 are retracted from the optical path, and thus the light flux passing through the imaging lens 201 reaches the imaging element 112. Then, the process advances to step S103. During any period in which the start of video recording is not determined, the process in step S102 is repeated.

A video recording operation is started in step S103. The image signal that has been continuously acquired and read out from the imaging element 112 is sequentially displayed on a display section such as a liquid crystal display or the like disposed in the back of the camera casing, and the image data is then stored in the storage medium 401.

Here, a description will be given of an operation during video recording. After the exposure operation of the imaging element 112 has been performed, the accumulated charge of each pixel within the imaging element 112 is read out as an image signal. This reading out operation is performed in synchronization with a control pulse vertical synchronization signal VD and a horizontal synchronization signal HD. The VD signal is a signal that represents one frame of imaging. For example, a command is received from the system controller 120 per 1/30 second, and the timing-pulse generation circuit 114 transmits a signal to the imaging element 112. Also, the HD signal is the horizontal synchronization signal of the imaging element 112. A number of pulses corresponding to the number of horizontal lines are transmitted in the period of one frame so as to control the horizontal lines. Also, a pixel reset is carried out per horizontal line such that a horizontal line is synchronized with an HD signal to become the set charge accumulation time. When an accumulation/read-out operation is executed by a VD signal or an HD signal, an accumulation operation for the next frame is started in accordance with the transmission timing of a VD signal. Also, the readout image signal is transferred to the image data controller 115 to be subjected to processing such as defective pixel correction or the like. Through image processing, the processed image signal is transmitted to the image display circuit 118 of the display section disposed on the rear face or the like of the camera. With regard to video recording, likewise, the readout signal is subjected to image processing and then transmitted to the storage medium 401 so as to sequentially record image data. It should be noted that these are well-known techniques and no further description will be made thereon.

In step S104, a light-metering operation is performed based on the signal that has been read out in step S103. During light-metering, the image data controller 115 divides the image signal into regions and supplies an value integrated for each bayer pixel in each region to the system controller 120. The system controller 120 evaluates the obtained integration signal to thereby perform light-metering processing. In the next step S105, an automatic exposure control for a moving image is performed based on the light-metering value determined in step S104 and lens information.

Figure 8:
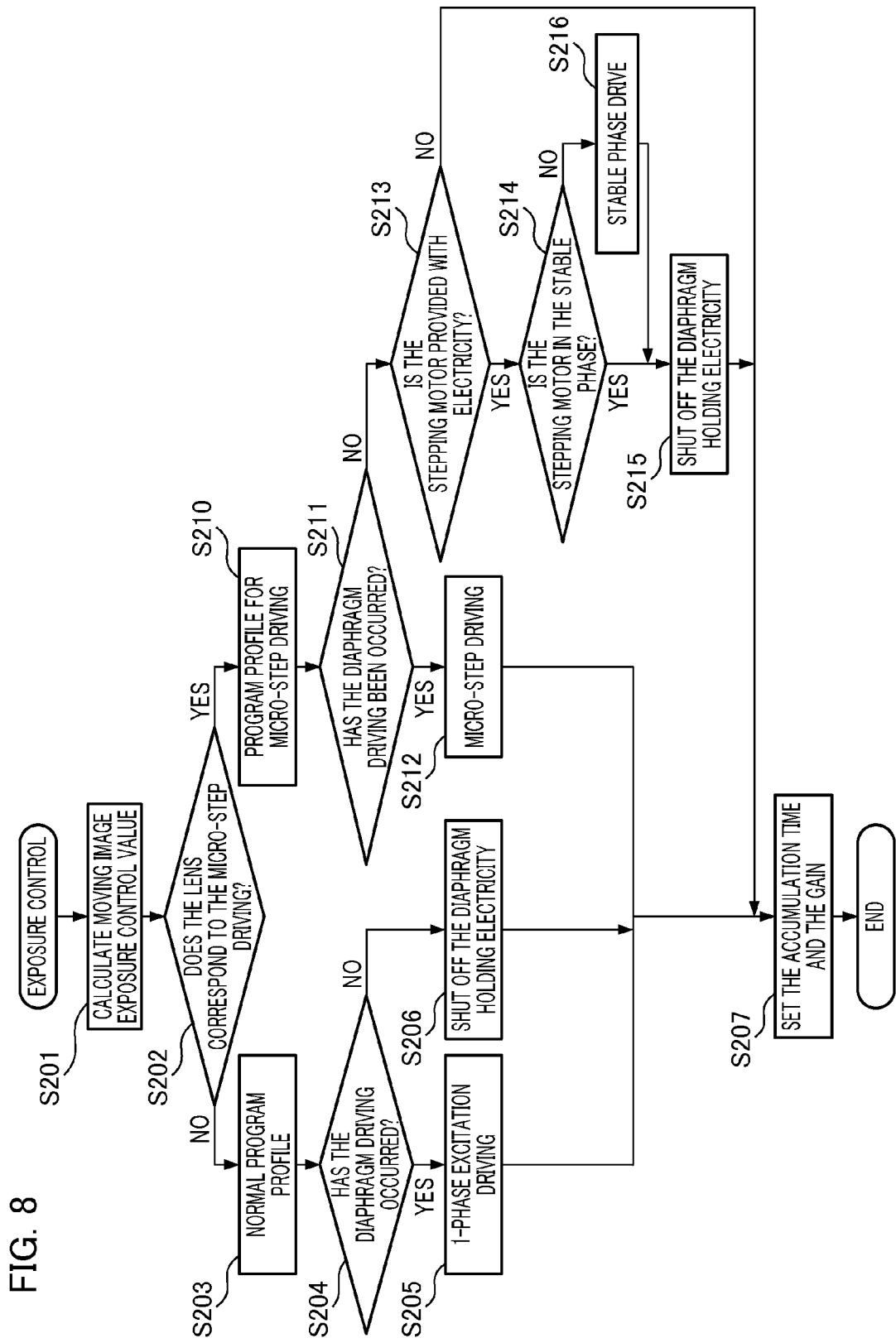
FIG. 8 is a flowchart illustrating an example of the flow of exposure control.

An exemplary automatic exposure control performed during video recording will now be described with reference to FIG. 8. In the present embodiment, the operation modes for driving the stepping motor for driving the diaphragm are switched depending on the type of the lens section.

First, in step S201, the control value Bv of the camera is calculated based on the light-metering value (Bv value) determined in step S104 such that moving image exposure becomes a predetermined brightness level. Here, the Bv value is an index value that indicates brightness represented by the following formula [Formula 1], and is a value that is uniquely determined by the combination of Tv, Av, and Sv in which the object with brightness represented by the index value becomes an appropriate exposure level. Tv represents a shutter-speed, Av represents a diaphragm value, and Sv represents a sensitivity. Also, the control value Bv is a set value determined by the combination of Tv, Av, and Sv for controlling the camera.

$$Bv=Tv+Av-Sv \quad \text{[Formula 1]}$$

Figure 9:
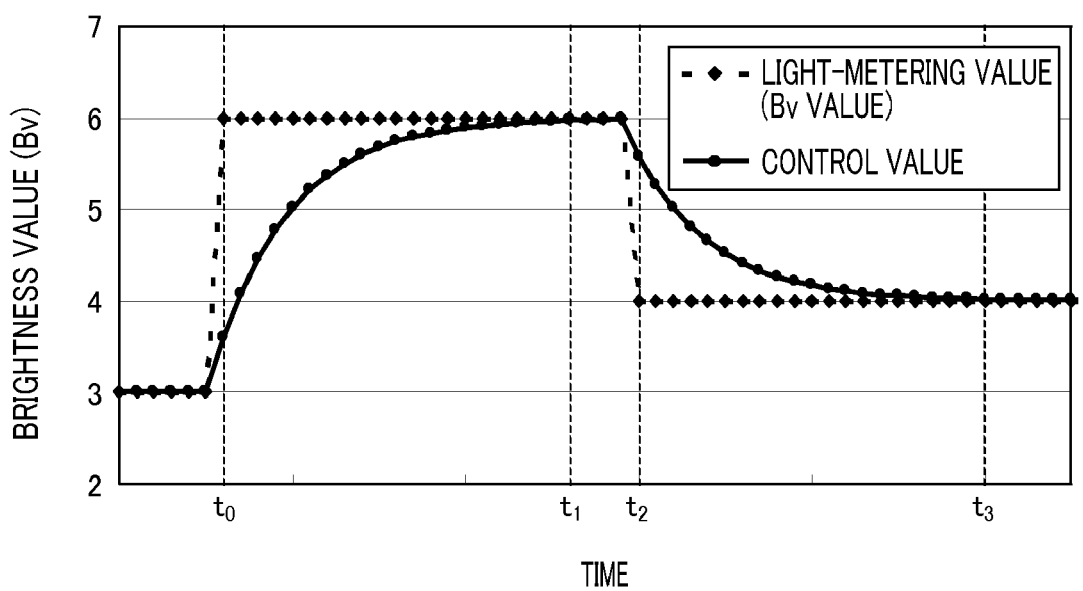
FIG. 9 is an explanatory diagram illustrating the exposure-response relationship during video photography.

In general, for moving image exposure, a variation of exposure between successive frames such as flickering, hunting, and the like occurs. Hence, it is desirable that exposure be performed in slow and smooth response to some degree of time constant. FIG. 9 shows an exemplary graph illustrating the variation with time of the control value Bv and the variation with time of the Bv value. When the brightness of the object changes during video recording, for example, the response of the light-metering value (Bv value) and the control value (control value Bv) as shown in FIG. 9 is expected. In the present example, when the brightness value of the object rises from Bv3 and changes to Bv6 at the time t0, the control value Bv of the camera slowly and smoothly changes from time t0 to the time t1 to reach an appropriate exposure level (Bv6) at the time t1. Also, when the brightness value of the object drops from Bv6 and changes to Bv4 at the time t2, the control value Bv of the camera slowly and smoothly changes from the time immediately before t2 to the time t3 in the same manner to reach an appropriate exposure level (Bv4) at the time t3. Such a change is realized by determining the control value Bv using a predetermined response function.

In step S202 shown in FIG. 8, it is determined whether or not the imaging lens unit 200 mounted on the camera body 100 corresponds to the diaphragm driving in the micro-step drive (hereinafter referred to as "micro-step diaphragm driving") based on the lens information acquired in step S101 shown in FIG. 7. In the case of the imaging lens unit not corresponding to the micro-step diaphragm driving, the process advances to step 203, whereas in the case of the imaging lens unit corresponding to the micro-step diaphragm driving, the process advances to step S210.

The operation mode for exposure control is respectively selected depending on whether or not the imaging lens unit 200 mounted on the camera body 100 corresponds to the micro-step diaphragm driving. Specifically, when the imaging lens unit 200 mounted on the camera body 100 includes a diaphragm driving mechanism corresponding to the micro-step driving, the operation mode is switched to a first operation mode (silent drive mode). In the first operation mode, a phase by which the position of a rotor is not held when a current to be supplied to a plurality of coils is shut off is used. Also, when the imaging lens unit 200 mounted on the camera body 100 does not include a diaphragm driving mechanism corresponding to the micro-step drive, the operation mode is switched to a second operation mode. In the second operation mode, only a phase by which the position of a rotor is held when a current supplied to the plurality of coils is shut off is used. By switching between two operation modes, the optimum program profile is respectively selected in response to the drive characteristics of the diaphragm. In other words, in the first operation mode, a first program profile in which the charge accumulation time is fixed so as to change the diaphragm value for performing exposure control in a predetermined brightness range is selected (see FIG. 10B). In the second operation mode, a second program profile in which the diaphragm value is fixed so as to change the charge accumulation time for performing exposure control in a predetermined brightness range is selected (see FIG. 10A). With this arrangement, exposure flickering or the like, which is caused by the diaphragm operation, can be suppressed by reducing the number of diaphragm driving times even for an imaging lens unit which provides poor controllability of the diaphragm. In addition, an optimum current control for the diaphragm can be switched in response to the operation modes.

Figure 10A:
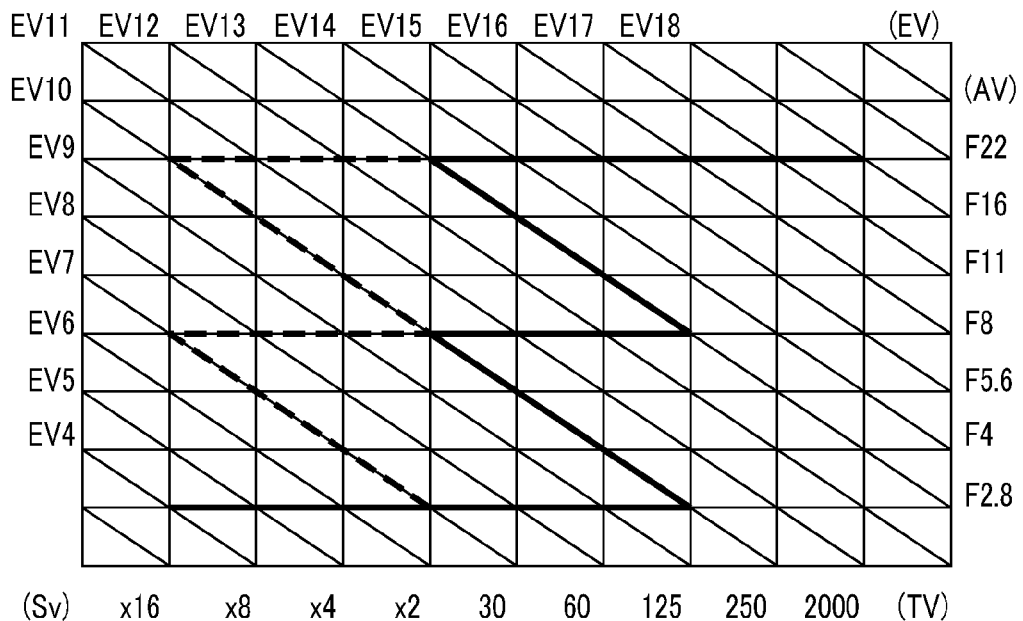
FIG. 10A is a program profile illustrating an example of exposure control performed during video photography.

In step S203, an exposure control value is determined in accordance with the second program profile. FIG. 10A shows an exemplary program profile for an imaging lens unit that does not correspond to the micro-step diaphragm driving. With this program profile, the charge accumulation time, the diaphragm value, and the gain value for controlling the camera are determined. As features of the second program profile, the set value (Av) of the diaphragm is discretely selected (see F2.8, F8, and F22 in FIG. 10A), and a fine exposure value is set by changing the charge accumulation time (Tv) and the gain (Sv). Here, the actually selected diaphragm set value is intended to be a rounded value such that it is the stop position of the 1-phase excitation drive for the stepping motor for driving the diaphragm. Also, the diaphragm set value has a hysteresis (indicated by the dashed lines) of ±3 steps. Hence, once the diaphragm driving occurs, the diaphragm driving does not occur again for changes in brightness within the range of the hysteresis. Specifically, exposure flickering or the like can be suppressed by reducing the number of diaphragm driving times even for an imaging lens unit which provides poor controllability of the diaphragm. In contrast, when the diaphragm driving occurs, flickering, rapid depth change, and diaphragm driving noise are recorded in a moving image.

In step S204, the system controller 120 compares the current diaphragm value controlled by the camera with the diaphragm set value determined in step S203 so as to determine whether or not the diaphragm driving occurs. A determination of the presence or absence of the diaphragm driving is carried out by comparing the amount of change in position of the diaphragm, i.e., the difference between the current diaphragm value and the set value with a predetermined amount (a preset reference value). When the amount of change in the position of the diaphragm is equal to or greater than a predetermined amount as a result of the determination and thus the diaphragm driving occurs, the process advances to step S205, whereas when the amount of change in the position of the diaphragm is less than a predetermined amount as a result of the determination and thus the diaphragm driving does not occur, the process advances to step S206.

In step S205, a request for driving the diaphragm is made from the system controller 120 to the optical system control section 207 such that the diaphragm value becomes the one determined in step S203. At this time, the 1-phase excitation drive described above is selected as the drive method of the stepping motor, and thus the rotor of the stepping motor is always stopped at a position facing the magnetic poles of the stator.

In step S206, since the diaphragm driving does not occur, a shut-off command for diaphragm holding current is transmitted from the system controller 120 to the optical system control section 207, then a current supplied to the stepping motor is shut off and a holding current thereby becomes zero. At this time, the stop position of the diaphragm is controlled by the drive control in step S205 such that the stepping motor is always stopped at a position where the rotor and the magnetic poles of the stator face to each other. Hence, since the permanent magnet rotor attracts the metal stator to some extent even if a current is shut off, a shift of the stop position of the diaphragm can be prevented.

After performing steps S205 and S206, the process advances to step S207. Here, in order to obtain the charge accumulation time and the gain determined in step S203, the timing-pulse generation circuit 114, the A/D converter 113, and the image data controller 115 are set to thereby perform exposure control of a moving image, and a series of processing steps described above is ended.

In contrast, when the imaging lens unit 200 corresponding to the micro-step diaphragm driving is mounted on the camera body 100 in step S202, the process proceeds to step S210.

Figure 10B:
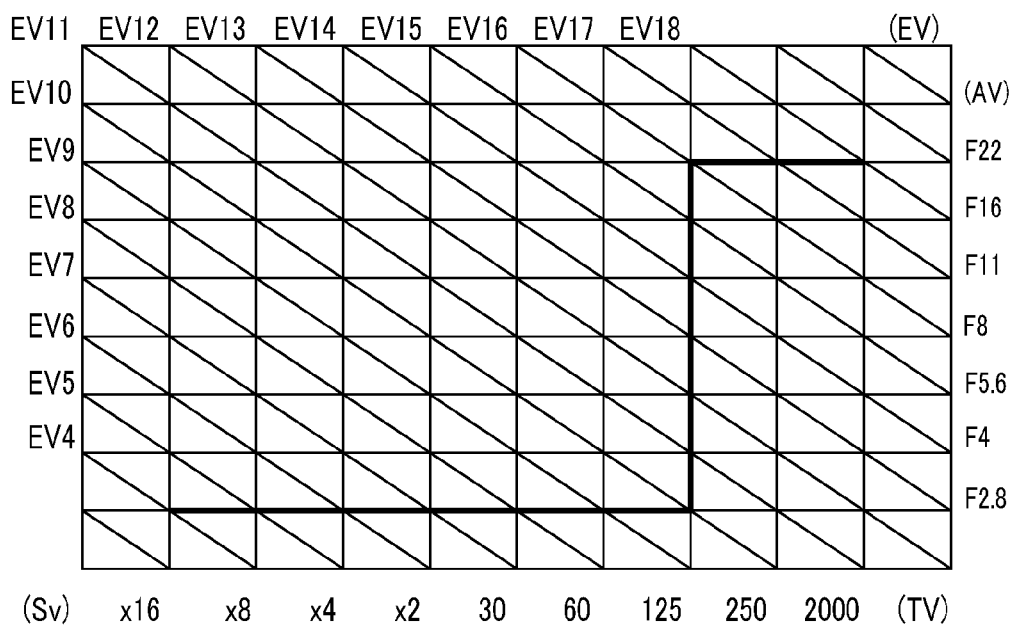
FIG. 10B is a program profile illustrating an example of exposure control performed during video photography.

In step S210, the exposure control value is determined in accordance with the first program profile. FIG. 10B shows an exemplary program profile for an imaging lens unit that corresponds to the micro-step driving. With this program profile, the charge accumulation time, the diaphragm value, and the gain value for controlling the camera are determined. As features of the first program profile, settings of the charge accumulation time and the gain are fixed in a predetermined brightness range (see from Ev10 to Ev16 in FIG. 10B) so as to change the diaphragm value for performing exposure control. At this time, since the diaphragm is driven by the micro-step drive, flickering and rapid depth change upon exposure of a moving image to be recorded, and diaphragm driving noise during recording are suppressed. In contrast, in the micro-step drive described above, the magnetic pole of the rotor may be stopped so as to face at a position intermediate between the adjacent magnetic poles of the stator. Hence, when the electricity supplied to the stepping motor is shut off under the stop state, the rotor may be moved to a stable position.

In step S211, the system controller 120 compares the current diaphragm value controlled by the camera with the diaphragm set value determined in step S210 so as to determine whether or not the diaphragm driving occurs. At this time, when the difference between the current position of the diaphragm and the diaphragm set value determined by calculation lies within a predetermined range, the system controller 120 can determines that the diaphragm driving is not necessary. This is because of the suppression of a hunting phenomenon to be described below, in which a shut-off state of current supplied to the stepping motor and a reactivation state frequently happen, occurs, which results in irregular diaphragm driving. Also, the exposure error within a predetermined range may be corrected by setting the charge accumulation time or the gain so as to obtain an appropriate exposure level. When the diaphragm driving occurs in step S211, the process advances to step S212, whereas when the diaphragm driving does not occur, the process advances to step S213.

In step S212, a request for driving the diaphragm is made from the system controller 120 to the optical system control section 207 such that the diaphragm value becomes the one determined in step S210. At this time, the micro-step driving is selected as the driving method of the stepping motor. Then, the process advances to step S207.

In step S213, the system controller 120 obtains status information from the imaging lens unit 200 so as to determine whether or not the stepping motor is provided with electricity. When a current supplied to the stepping motor is shut off, the process advances to step S207, whereas when the stepping motor is provided with electricity, the process advances to step S214.

In step S214, the system controller 120 obtains status information from the imaging lens unit 200 so as to determine the stop phase of the rotor of the stepping motor. When the system controller 120 determines that the stop phase of the rotor is a stable phase, i.e., the rotor and the magnetic poles of the stator face to each other, the process advances to step S215. Here, a control command is transmitted to the imaging lens unit 200 to shut off the current supplied to the stepping motor, whereby a holding current becomes zero. On the other hand, when the system controller 120 determines that the stop phase of the rotor is an unstable phase, i.e., the rotor is positioned intermediate between the stator and the stator, the process proceeds to step S216.

In step S216, a request for micro-step driving is made from the system controller 120 to the optical system control section 207 such that the stop phase shifts from the unstable phase to the stable phase with the smallest rotation angle of the rotor. Exposure of a moving image is stabilized by this process. When the diaphragm driving does not occur, the position of the rotor of the stepping motor is guided to the stable phase. Then, the process advances to steps S215 and S207.

The explanation will be continued with reference again to FIG. 7. When the end of video recording is reported by an operation button (not shown) in step S106, the system controller 120 ends video recording/photographing to return the quick return mirror 102 and the sub-mirror 103 from their retracted position. Then, processing is ended. When the end of video recording/photographing is not reported, the process returns to step S103 so as to continue video recording/photographing.

While in the present embodiment, the phase in which the rotor does not rotate even if the electricity supplied to the stepping motor is shut off in the case of the 1-phase excitation drive is employed, the present invention is not limited thereto. The phase in which the rotor does not rotate even if the electricity supplied to the stepping motor is shut off in the case of the 2-phase excitation drive may also be employed.

As described above, in the present embodiment, a method for controlling a stepping motor and a method for controlling energization of the stepping motor are switched in response to the imaging lens unit mounted on the camera body. With this arrangement, an exposure control for a favorable moving image can be realized and an optimum current control can be made in accordance with the operation modes, whereby the lower power consumption of the imaging apparatus can be realized.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-224547 filed Sep. 29, 2009 which is hereby incorporated by reference herein in its entirety.

What is claimed is:

1. An imaging apparatus to which an interchangeable lens unit is mountable, wherein the lens unit has a lens group, a diaphragm, and a stepping motor configured to drive the diaphragm, the stepping motor including a plurality of coils, the imaging apparatus comprising:
a control unit configured to control exposure during video photography by changing a diaphragm value, a charge accumulation time or a gain of an imaging element, wherein the control unit controls the stepping motor by exciting the plurality of coils, and switches operation modes in association with the driving of the stepping motor depending on the type of the lens unit; and
a determination unit configured to determine whether or not the position of the diaphragm is changed by shutting off a current supplied to the plurality of coils,
wherein, in a first operation mode that the driving of the stepping motor is different from a second operation mode, the control unit controls the stop position of the diaphragm based on the output of the determination result obtained by the determination unit,
wherein the first operation mode is a mode which uses a phase by which the position of a rotor is not held when a current supplied to the plurality of coils is shut off, and the second operation mode is a mode which uses a phase by which the position of a rotor is held when a current supplied to the plurality of coils is shut off.

2. The imaging apparatus according to claim 1, wherein, when the determination unit determines that the amount of change in position of the diaphragm is less than a predetermined amount, the control unit performs exposure compensation while changing the charge accumulation time or the gain without changing the position of the diaphragm.

3. The imaging apparatus according to claim 1, wherein, when the determination unit determines that the amount of change in position of the diaphragm is equal to or greater than a predetermined amount, the control unit changes the position of the diaphragm.

4. The imaging apparatus according to claim 1, wherein the control unit, in the first operation mode, selects a first program profile including exposure control through which the charge accumulation time is fixed so as to change the diaphragm value, and, in the second operation mode, selects a second program profile including exposure control through which the diaphragm value is fixed so as to change the charge accumulation time.

5. The imaging apparatus according to claim 4, wherein the control unit performs micro-step driving for the stepping motor in the first operation mode, and performs 1-phase excitation driving for the stepping motor in the second operation mode.

6. The imaging apparatus according to claim 5, wherein, when it is determined that the lens unit has a diaphragm driving mechanism corresponding to the micro-step driving, the control unit selects the first program profile in the first operation mode, whereas when it is determined that the lens unit does not have a diaphragm driving mechanism corresponding to the micro-step driving, the exposure control unit selects the second program profile in the second operation mode.

7. The imaging apparatus according to claim 6, wherein, when the determination unit determines in the first operation mode that the amount of change in position of the diaphragm is less than a predetermined amount, the control unit controls the stop position of the stepping motor and then cuts off the current supplied to the plurality of coils, whereas when the determination unit determines in the second operation mode that the amount of change in position of the diaphragm is less than a predetermined amount, the control unit cuts off the current supplied to the plurality of coils.

8. The imaging apparatus according to claim 1, wherein the determination unit is configured to determine whether or not the amount of change in the position of the diaphragm is equal to or greater than a predetermined amount, when a current supplied to the plurality of coils is shut off.

9. A method for controlling an imaging apparatus to which an interchangeable lens unit is mountable, wherein the lens unit has a lens group, a diaphragm, and a stepping motor configured to drive the diaphragm, the stepping motor including a plurality of coils, the method comprising:
controlling exposure during video photography by changing a diaphragm value, a charge accumulation time, or a gain of an imaging element, wherein, in the controlling step, the stepping motor is controlled by exciting the plurality of coils and operation modes are switched in association with the driving of the stepping motor depending on the type of the lens; and
determining whether or not the position of the diaphragm is changed by shutting off a current supplied to the plurality of coils,
wherein, in a first operation mode that the driving of the stepping motor is different from a second operation mode, the stop position of the diaphragm is controlled based on the result of the determining step,
wherein the first operation mode is a mode which uses a phase by which the position of a rotor is not held when a current supplied to the plurality of coils is shut off, and the second operation mode is a mode which uses a phase by which the position of a rotor is held when a current supplied to the plurality of coils is shut off.

* * * * *